United States Patent
Li et al.

(10) Patent No.: US 7,788,263 B2
(45) Date of Patent: Aug. 31, 2010

(54) PROBABILISTIC RETROSPECTIVE EVENT DETECTION

(75) Inventors: Zhiwei Li, Beijing (CN); Mingjing Li, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 181 days.

(21) Appl. No.: 11/256,353

(22) Filed: Oct. 21, 2005

(65) Prior Publication Data

US 2007/0038653 A1 Feb. 15, 2007

Related U.S. Application Data

(60) Provisional application No. 60/707,009, filed on Aug. 10, 2005.

(51) Int. Cl.
*G06F 17/30* (2006.01)
*G06F 17/00* (2006.01)

(52) U.S. Cl. .................................................... 707/738
(58) Field of Classification Search ................ 707/3, 707/100–104.1, 200–206, 738
See application file for complete search history.

(56) References Cited

U.S. PATENT DOCUMENTS

| 5,325,298 | A |   | 6/1994 | Gallant |   |
|---|---|---|---|---|---|
| 5,488,725 | A | * | 1/1996 | Turtle et al. | 707/5 |
| 6,405,188 | B1 |   | 6/2002 | Schwartz et al. |   |
| 6,424,968 | B1 |   | 7/2002 | Broster et al. |   |
| 6,804,688 | B2 | * | 10/2004 | Kobayashi et al. | 707/203 |
| 6,925,433 | B2 | * | 8/2005 | Stensmo | 704/9 |
| 2002/0007364 | A1 | * | 1/2002 | Kobayashi et al. | 707/203 |
| 2002/0129011 | A1 |   | 9/2002 | Julien |   |
| 2002/0194158 | A1 | * | 12/2002 | Stensmo | 707/2 |
| 2004/0093349 | A1 |   | 5/2004 | Buinevicius et al. |   |
| 2004/0230572 | A1 |   | 11/2004 | Omoigui |   |
| 2005/0021490 | A1 | * | 1/2005 | Chen et al. | 707/1 |
| 2005/0071150 | A1 |   | 3/2005 | Nasypny |   |
| 2005/0216443 | A1 |   | 9/2005 | Morton et al. |   |

FOREIGN PATENT DOCUMENTS

| GE | 2359210 A | 8/2001 |
|---|---|---|
| KR | 20020003701 A | 1/2002 |

OTHER PUBLICATIONS

Yang et al., "Learning approaches for detecting and tracking news events", Aug. 1999, IEEE Intelligent Systems, vol. 14, No. 4.*
Kanungo et al., An efficient k-means clustering algorithm: analysis and implementation., Jul. 2002, IEEE Transactions on Pattern Analysis and Machine Intelligence, vol. 24, Issue 7, pp. 881-892.*

(Continued)

*Primary Examiner*—James Trujillo
*Assistant Examiner*—Dawaune Conyers
(74) *Attorney, Agent, or Firm*—Lee & Hayes, PLLC

(57) ABSTRACT

Probabilistic retrospective event detection is described. In one aspect, event parameters are initialized to identify a number of events from a corpus of documents. Using a generative model, documents are determined to be associated with an event to detect representative events from the identified number of events.

17 Claims, 5 Drawing Sheets

OTHER PUBLICATIONS

Zhang et al., "Novelty and redundancy detection in adaptive filtering", 2002, ACM SIGIR, pp. 81-88.*

Jebara et al., "Maximum conditional likelihood via bound maximization and the CEM algorithm", 1998, NIPS 11.*

Li et al., "A Probabilistic Model for Retrospective News Event Detection", Aug. 2005, ACM, pp. 106-113.*

Bikel et al., "An Algorithm that learns What's in a Name, Feb. 1999, Springer Netherlands", vol. 34, No. 1-3, pp. 211-231.*

McCallum et al., "A Comparison of Event Models for Naïve Bayes Text Classification", 1998, AAAI press, pp. 41-48.*

PCT International Search Report and Written Opinion and dated Jan. 22, 2007, from counterpart PCT patent application serial No. PCT/US2006/031194, copy attached, 9 pages.

"Microsoft Office Power Point 2003", http://office.microsoft.com/training/Training.aspx?AssetID=RP010713281033&CIT=RC010713231033, , retrieved on Oct. 29, 2007, 16 pages.

Jinwoun, et al., "Story Board Construction using Segmentation of MPEG Encoded News Video," Circuits and Systems, 2000, Proceedings of the 43rd IEEE Midwest Symposium on Aug. 8-11, 2000, pp. 758-761.

Lu, et al., "Automated Rich Presentation of a Semantic Topic," 13th Annual ACM International Conference on Multimedia, Nov. 6, 2005, pp. 745-753.

* cited by examiner

200

COMPUTING DEVICE 202

PROGRAM MODULES 204

PROBABILISTIC RETROSPECTIVE EVENT DETECTION MODULE
208

OTHER PROGRAM MODULES
(E.G., OPERATING SYSTEM, APPLICATION(S), ETC.)
210

PROGRAM DATA 206

GENERATIVE MODEL
(E.G., MIXTURE OF THREE UNIGRAM MODELS AND A GAUSSIAN MIXTURE MODEL (GMM))
212

NEWS EVENT ARTICLE/DOCUMENT CORPUS
(E.G., CRAWLED DOCUMENTS, GENERATED NEWS ARTICLES FOR EACH EVENT ENTITY, ETC.)
214

EVENT CLUSTERS
218

EVENT SUMMARIES
220

OTHER DATA
(E.G., MODEL PARAMETERS, TEXT INDEX, KEYWORD(S) IDENTIFYING A SEMANTIC TOPIC, EVENT CLUSTERS, TRAINED CLASSIFICATION MODELS, INTERMEDIATE DATA VALUES AND CALCULATIONS, ETC.)

*Fig. 2*

PROBABILISTIC RETROSPECTIVE EVENT DETECTION

RELATED APPLICATIONS

This patent application claims priority to U.S. provisional patent application Ser. No. 60/707,009, filed on Aug. 10, 2005, titled "A Probabilistic Model for Retrospective News Event Detection", commonly assigned hereto, and incorporated by reference.

BACKGROUND

An event, such as a news event, is a specific thing that has happened or will happen at a specific time and place. Many documents such as news articles may report the event over time. Retrospective Event Detection (RED) is a technique for discovery of previously unidentified events in historical news corpus. Although RED has been studied for many years, RED can be improved.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, probabilistic retrospective event detection is described. In one aspect, event parameters are initialized to identify a number of events from a corpus of documents. Using a generative model, documents are determined to be associated with an event to detect representative events from the identified number of events.

BRIEF DESCRIPTION OF THE DRAWINGS

In the Figures, the left-most digit of a component reference number identifies the particular Figure in which the component first appears.

FIG. 2 shows an exemplary system for probabilistic retrospective event detection, according to one embodiment.

DETAILED DESCRIPTION

Overview

News articles typically correspond to events. A news article contains two kinds of information: contents and timestamps. Both types of information are very helpful for RED task. However, conventional systems and techniques for RED typically focus on finding better utilizations of news article content. That is, these conventional RED systems and techniques do not typically utilize time information, and if they do use time information, it is generally used unsatisfactorily.

In contrast to such conventional techniques, systems and methods for probabilistic retrospective event detection are described below in reference to FIGS. 1-6. These systems and methods provide a unified framework to explicitly evaluate document (e.g., news article) content and time information over an objectively determined number of events. The objectively determined number of events is determined as a function of document count over time distribution. This framework addresses multiple articles reporting a same event, often redundantly, across multiple news sources.

Figure 1:
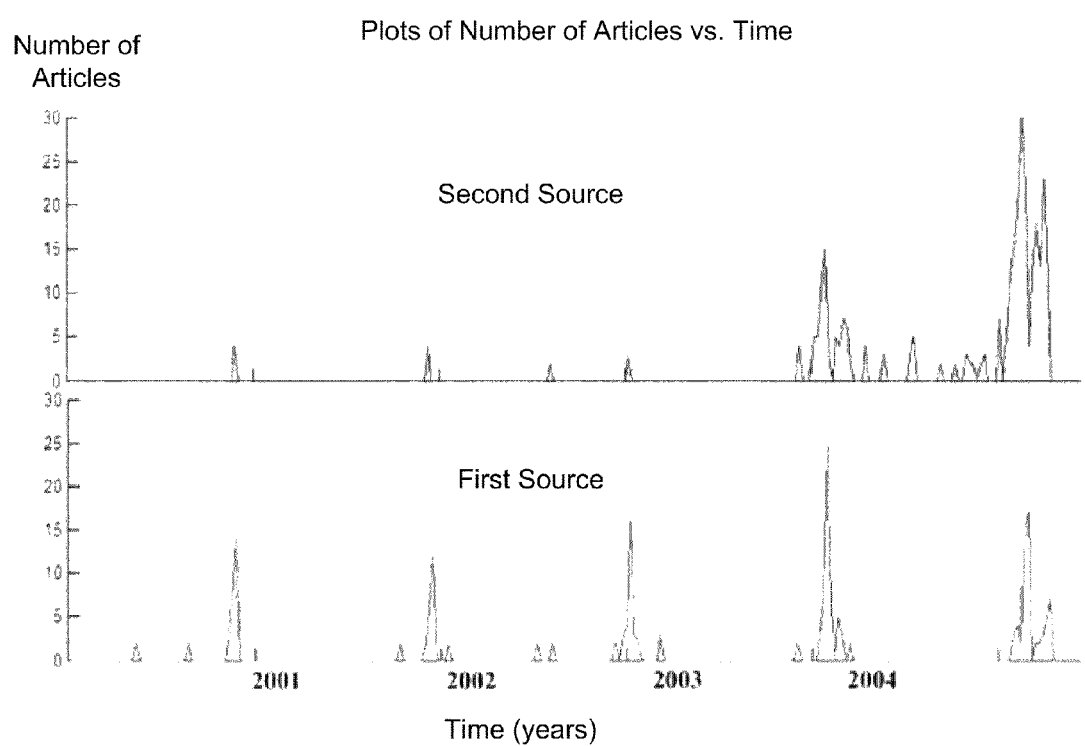
FIG. 1 illustrates a count of news stories on a topic "Halloween" (a semantic topic) posted by a first news source (bottom) and a second news source (top) as a function of time.

FIG. 1 illustrates a count of news stories on a topic "Halloween" (a semantic topic) posted by a first news source (bottom) and a second news source (top) as a function of time. The horizontal axis is time, and the vertical axis is number of stories. In this example, the unit of the horizontal axis is a year. As shown, news Stories reporting "Halloween" tend to appear only around the Halloween. In this example, "Halloween" is a topic, while it typically includes many events (e.g., each year, Halloween is an event). This figure shows two significant characteristics of news articles and events.

News reports typically result from events, and event article counts change over time. Mapping to the plot of article count-time distribution, events are peaks (as shown in FIG. 1). However, in some situations, several events could be overlapping on time, that is, the observed peaks and events may not exactly correspond, or peaks may not be evident.

Across different news sites, article contents and times (e.g., publication times, event duration, etc.) reporting a same event are typically similar, especially with respect to articles reporting a significant event. Event reporting start and end time across different web sites also tend to be very similar, although news article quantity across various web sites may differ. For example, as shown in FIG. 1, in each year, both the first news source and the second news source began reporting "Halloween" from the beginning of October, and stopped such reporting in early December.

The probabilistic model for retrospective event detection takes these various characteristics of news articles and events into account. For instance, because news reports typically result from an event, and because event article counts change over time, the probabilistic model for retrospective event detection uses a latent variable model to model articles and news events. In the latent variable model, events are latent variables and articles are observations. The second characteristic enables the collection of many news stories on the same event by mixing articles from different sources. Because news stories posted on websites are simple to obtain and web sites are often used to publish news, one embodiment of the probabilistic model for retrospective event detection detects news events from these sources, although it is understood that events could be detected from other sources (e.g., historical databases, etc.).

These and other aspects for probabilistic retrospective event detection are now described in greater detail.

Representations of News Articles and News Events

In this implementation, news articles (document content) are represented by one or more of four types of information: who (persons), when (time), where (locations) and what (keywords). Additionally, a news event is represented by one or more of persons, time (defined as the period between the first article and the last article), locations, and keywords. For a news article, a timestamp is a discrete value. For a news event, time consists of two values defining a continuum; a begin time and an end time (duration). Thus, a news article and an event are represented as follows:

article={persons, locations, keywords, time} event={persons, locations, keywords, time}

Keywords represent remainder contents after removing named entities and stop words from articles. The contents of news articles are divided into three kinds of information—persons, locations, and keywords. To simplify this model, the four kinds of information of a news article are independent:

$p(\text{article}) = p(\text{persons})p(\text{locations})p(\text{keywords})p(\text{time})$.

Typically, there are many named entities and keywords in news articles. For purposes of discussion, each entity and keyword is referred to as a respective "entity." As a result, there are three kinds of entities, and each kind of entity has its own term space.

An Exemplary System

Although not required, embodiments for probabilistic retrospective news event detection are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 2 shows an exemplary system 200 for probabilistic retrospective news event detection, according to one embodiment. In this implementation, system 200 includes a general-purpose computing device 202. Computing device 202 represents any type of computing device such as a personal computer, a laptop, a server, handheld or mobile computing device (e.g., a small form factor device), etc. Computing device 202 includes program modules 204 and program data 206 for automatic rich presentation of semantic topics. Program modules 204 include, for example, probabilistic retrospective event detection module 208 (hereinafter often referred to as "event detection module 208") and other program modules 210 such as an operating system, Web crawler application, etc.

Event detection module 208 implements a unified probabilistic framework for retrospective event detection. The unified probabilistic framework uses a generative model 212 to detect news articles. Recognizing that article contents and timestamps are heterogeneous features, this generative model models article contents and timestamps using four different types of mixture models: three unigram mixture models and one Gaussian Mixture Model (GMM). Event detection module 208 utilizes the mixture of unigram models to respectively model article content, including information about persons, locations, and keywords. Event detection module 208 utilizes the GMM to model timestamps.

More particularly, and with respect to article content, a bag of words model is an effective representation of documents, and the Naïve Bayes (NB) classifier based on this model works very well on many text classification and clustering tasks. In view of this, event detection model 208 implements a mixture of unigram models to model article contents. Person and location entities provide significant news article information. However, person and location entities typically occupy only a small part of the contents. If the whole contents were to be modeled with one model, person and location information could be overwhelmed by keywords. To address this, event detection model 208 respectively models persons, locations and keywords with three unigram mixture models.

With respect to timestamps, each event corresponds to a peak on article count-time distribution, whether it this peak can be observed or not. In other words, the distribution is a mixture of many distributions of events. A peak is modeled by a Gaussian function, where the mean is the position of the peak and the variance is the duration of event. Thus, event detection module 208 utilizes the Gaussian Mixture Model (GMM) to model timestamps.

In view of the above, the generative model implemented by event detection module 208 includes a combination of four mixture models: three mixture of unigram models and one GMM. Before illustrating the generative model, we first describe utilized notations.

A news article $x_i$ is represented by three vectors: persons$_i$, locations$_i$ and keywords$_i$, and one timestamp, times$_i$. The vector persons$_i$ is a list, <person$_{i1}$, ..., person$_{iN}$>, and each element is the occurrence count of corresponding entity in $x_i$. Analogously defined are vectors for locations$_i$ and keywords$_i$. A j-th event is represented by $e_j$.

News article generation (i.e., writing) can be described as a two-step generating process. When an article about computer science is written, the article will likely include a word about computer science (e.g. software, algorithms). Whereas, an article about geography will likely include word(s) such as map, rock, miners, and/or so on. In view of these probabilities, given a topic, one will typically select topic-related word to generate an article regarding the topic. This is the process named "Generate Model". In the generative model, the generating process is divided into two steps: select topic and generate a sample based the selected topic. Thus, the two-step news article generating process is described as follows.

Figure 3:
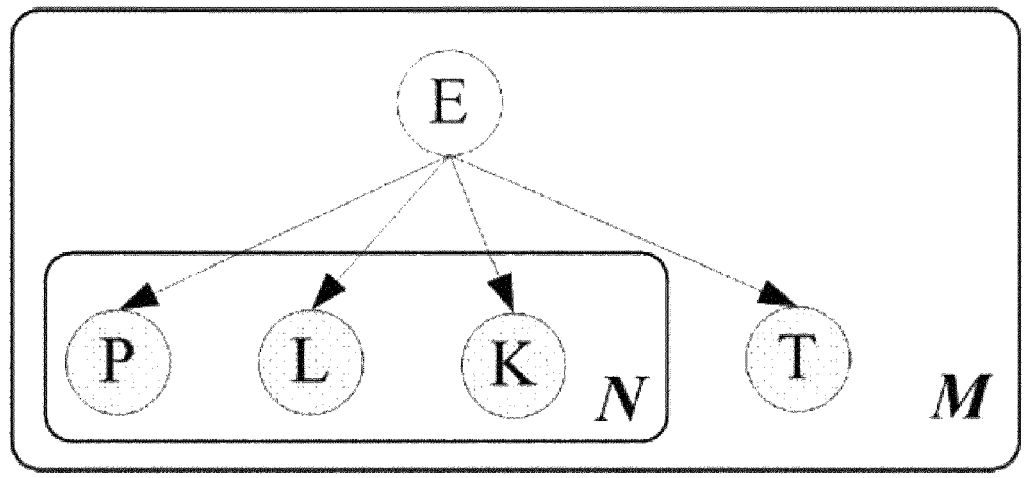
FIG. 3 shows an exemplary graphical model representation of a generative model of news articles, according to one embodiment.

Choose an event $e_j$: Multinomial($\theta^j$)
Generate a news article $x_i$: $p(x_i|e_j)$. For each entity of it, according to the type of current entity:
Choose a person person$_{ip}$: Multinomial($\theta_p^j$)
Choose a location location$_{ip}$: Multinomial($\theta_l^j$)
Choose a keyword. keyword$_{ip}$: Multinomial($\theta_n^j$)
For its timestamp: Draw a timestamp time$_i$: $N(u^j, \sigma^j)$ The vector $\theta^j$ represents mixing proportions, or the priors of events; $\theta_p^j$, $\theta_l^j$, and $\theta_n^j$ represents parameters of conditional multinomial distributions given event $e_j$; $\mu^j$ and $\sigma^j$ are parameters of the conditional Gaussian distribution given event $e_j$. FIG. 3 shows a graphical representation of this model.

FIG. 3 shows an exemplary graphical model representation of a generative model of news articles, according to one embodiment. In this figure, N represents the term space sizes of the three kinds of entities ($N_p$, $N_l$ and $N_n$). E, P, L, K and T represent events, persons, locations, keywords and time respectively. Shadow nodes are observable; or hidden. N (entities) and M (articles) at the bottom-right corners represent plates.

Learning Model Parameters

To group documents into different events, event detection module 208 calculates the probability that a document belongs to an event, that is $p(e_j|x_i)$, where $x_i$ is the ith obtained document and $e_j$ is the jth event. To calculate this probability value, event detection module 208 determines the likelihood, $p(x_i|e_j)$, based on Bayesian criteria using the generative model 212. Event detection module 208 groups (clusters) documents associated with corresponding events into event clusters 218.

In this implementation, parameters for the generative model 212 are estimated using Maximum Likelihood operations. As shown in FIG. 3, model parameter estimation is accomplished by introducing events, which are latent variables. The log-likelihood of the joint distribution is represented as follows:

$$l(X;\theta) \triangleq \log(p(X|\theta)) \qquad (1)$$
$$= \log\left(\prod_{i=1}^{M} P(x_i|\theta)\right)$$
$$= \sum_{i=1}^{M} \log\left(\sum_{j=1}^{k} p(e_j)p(x_i|e_j,\theta)\right)$$

Referring to Equation (1), X represents a corpus 214 of news articles; M and k are number of news articles and number of events respectively.

In one implementation, corpus 214 represents data from one or more Web-based databases (e.g., a news web site, multimedia database, etc.). In one implementation, event detection module 208 or an "other program module" 210 such as a Web crawler application evaluates documents from these web sites in advance to build a full text index for use by event detection module 208 to obtain documents relevant to an event (e.g., an event associated with a semantic topic). These crawling operations enable system 200 to utilize one or more conventional information retrieval technologies such as search query expansion to remove query ambiguousness and thereby, identify and index documents (multimodal information) of greater potential relevancy to the semantic topic.

Given an event j, the four kinds of information of the i-th article are conditional independent:

$$p(x_i|e_j)=p(time_i|e_j)p(persons_i|e_j)p(locations_i|e_j)p(keywords_i|e_j) \qquad (2)$$

Event distribution module 208 applies the Expectation Maximization (EM) algorithm to maximize log-likelihood. In one implementation, the parameters are estimated by running E-step and M-step alternatively. By using Jensen's inequality and the independent assumptions expressed in (2), in M-step, equation (1) is decoupled into the sum of four items. In each of these four items, there are only parameters of one model. Thus, parameters (time, persons, locations, and keywords) of the four mixture models are independently estimated. In E-step, event distribution module 208 computes the posteriors, $p(e|x_i)$, by:

$$p(e_n|x_j)^{(t+1)} = \frac{p(e_j)^{(t)} p(x_i|e_j)^{(t)}}{p(x_i)^{(t)}} \propto p(e_j)^{(t)} p(x_i|e_j)^{(t)} \qquad (3)$$

Referring to Equation (3), upper script (t) indicates the t-th iteration. In M-step, event distribution module 208 updates the parameters of the four models. Since persons, locations and keywords are modeled with independent mixture of unigram models, their update equations are the same. Token $w_n$ is utilized to represent the n-th entity. For the three mixture of unigram models, parameters are updated, for example, as follows:

$$p(w_n|e_j)^{(t+1)} = \frac{1 + \sum_{i=1}^{M} p(e_j|x_i)^{(t+1)} * tf(i,n)}{N + \sum_{i=1}^{M} \left(p(e_j|x_i)^{(t+1)} * \sum_{s=1}^{N} tf(i,s)\right)} \qquad (4)$$

Referring to Equation (4), tf(i,n) is the count of entity $w_n$ in $x_i$ and N is the vocabulary size. For each type of entities, N is the size of corresponding term space. Since the co-occurrence matrix is very sparse, event distribution module 208 applies Laplace smoothing to prevent zero probabilities for infrequently occurring entities in (4).

Event distribution model 208 updates the GMM parameters according to the following equation:

$$\mu_j^{(t+1)} = \frac{\sum_{i=1}^{M} p(e_j|x_i)^{(t+1)} * time_i}{\sum_{i=1}^{M} p(e_j|x_i)^{(t+1)}} \qquad (5)$$

$$\sigma_j^{(t+1)} = \frac{\sum_{i=1}^{M} p(e_j|x_i)^{(t+1)} * (time_i - \mu_j^{(t+1)})^2}{\sum_{i=1}^{M} p(e_j|x_i)^{(t+1)}}$$

Because both the means and variances of the Gaussian functions consistently change with the generative model 212, the Gaussian functions work like sliding windows on time line. In this manner, event distribution module 208 overcomes the shortcomings caused by the fixed windows or the parameter-fixed decaying functions used in traditional news event detection algorithms. Lastly, event distribution model 208 updates the mixture proportions:

$$p(e_j)^{(t+1)} = \frac{\sum_{i=1}^{M} p(e_j|x_i)^{(t+1)}}{M} \qquad (6)$$

Equations (5) and (6) are the same M-step updating equations as in GMM. The EM algorithm increases the log-likelihood consistently, while it will stop at a local maximum.

Number of Events (Event Number) Determination

In this implementation, the number of events (events number) to utilize for RED is estimated from article count-time distributions. As shown in FIG. 1, basically, each peak corresponds to one event (in no overlapping situation). Thus, in one implementation, an initial estimate of events number is set as the number of peaks. However, since noise may interfere with the distribution, there may be too many peaks on the distribution plot. To address this, event detection module 208 determines that only salient peaks across the distribution correspond to events. To detect salient peaks, salient scores for peaks in this implementation are defined as follows:

$$score(peak)=left(peak)+right(peak) \qquad (7)$$

Figure 4:
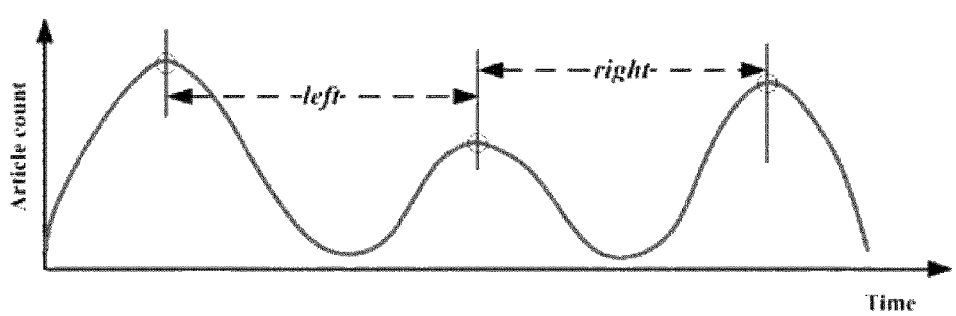
FIG. 4 shows an exemplary use of salient score to determine a number of events to utilize to retrospectively model and detect news events.

FIG. 4 shows an exemplary use of salient score to determine a number of events to utilize to retrospectively detect and model news events. Referring to FIG. 4, there are illustrated definitions of operator left and right of peak. Salient score of the middle peak is the sum of left and right. Left (right) is defined as the distance from current peak to the first higher peak on the left(right) hand. The operators, left and right, return distance to the most adjacent higher peaks.

In one implementation of an initializing step, event detection module 208 utilizes a hill-climbing approach to detect all peaks, and then compute salient score for each detected peak. A configurable number of peaks are determined to be salient peaks. For example, in one implementation, the top 20% peaks are used as salient peaks, and the number of salient peaks is the initial estimation of k (number of events). Alternatively, a user can specify the initial value of k (e.g. if user is only interested in the TOP 10 events, k=10). Once the initial estimation of k and the positions of salient peaks have been determined, event detection model 208 correspondingly initializes events parameters. In another implementation, several different initial values of k are obtained by splitting/merging initial salient peaks. Usually, peaks representing many news articles, or with heavy tails, may be mixtures of multiple events. In such scenarios, the peak are split to increase k and re-train the models.

In one implementation, log-likelihood is utilized to select a substantially optimal events number. Given this indicator, we apply the Minimum Description Length(MDL) principle to select among values of k:

$$k = \operatorname{argmax}\left(\log(p(X;\theta)) - \frac{m_k}{2}\log(M)\right) \quad (8)$$

$$m_k = 3k - 1 + k(N_p - 1) + k(N_l - 1) + k(N_n - 1)$$

Referring to Equation 8, the $\log(p(X;\theta))$ is expressed in (1) and $m_k$ is the number of free parameters needed for the generative model 212. As a consequence of this principle, when models with different values of k fit the data equally well, the simplest model is selected.

Event Summarization

In one implementation, event generation module 208 generates event summaries 220 by summarizing news events represented by event clusters 218. This is accomplished using one or more techniques. In one implementation, news events are summarized by choosing some features with the maximum probabilities to represent the events. For example, for event j, the 'protagonist' is the person with the maximum $p(\text{person}_p|e_j)$. Locations and keywords are similarly chosen. However, such summarizations may be difficult to read. Thus, as an alternative, a single news article is selected as the representative news article for each news event.

Once the probabilistic distributions of persons, locations, keywords and time conditioned on events has been determined, news articles are assigned to events by Maximum a Posterior(MAP) principle, as follows:

$$y_i = \operatorname*{argmax}_j(p(e_j|x_i)) \quad (9)$$

Referring to Equation 9, $y_i$ is the label of news article $x_i$. The news article $x_i$ with the maximum $p(x_i|e_j)$ among articles assigned to the j-th event is a good representative of the event j, or the first article of each event is also a good representative.

Exemplary Procedure

An exemplary procedure for multi-modal probabilistic RED is shown in TABLE 1, according to one embodiment. The reason that the procedure is multi-modal is because news articles are modeled by four sub-models: persons, locations, time and keywords. The generative model 212 is a combination of the four sub-models. The maximum and minimum numbers of events are configurable in that they can be subjectively specified or preset.

TABLE 1

Figure 5:
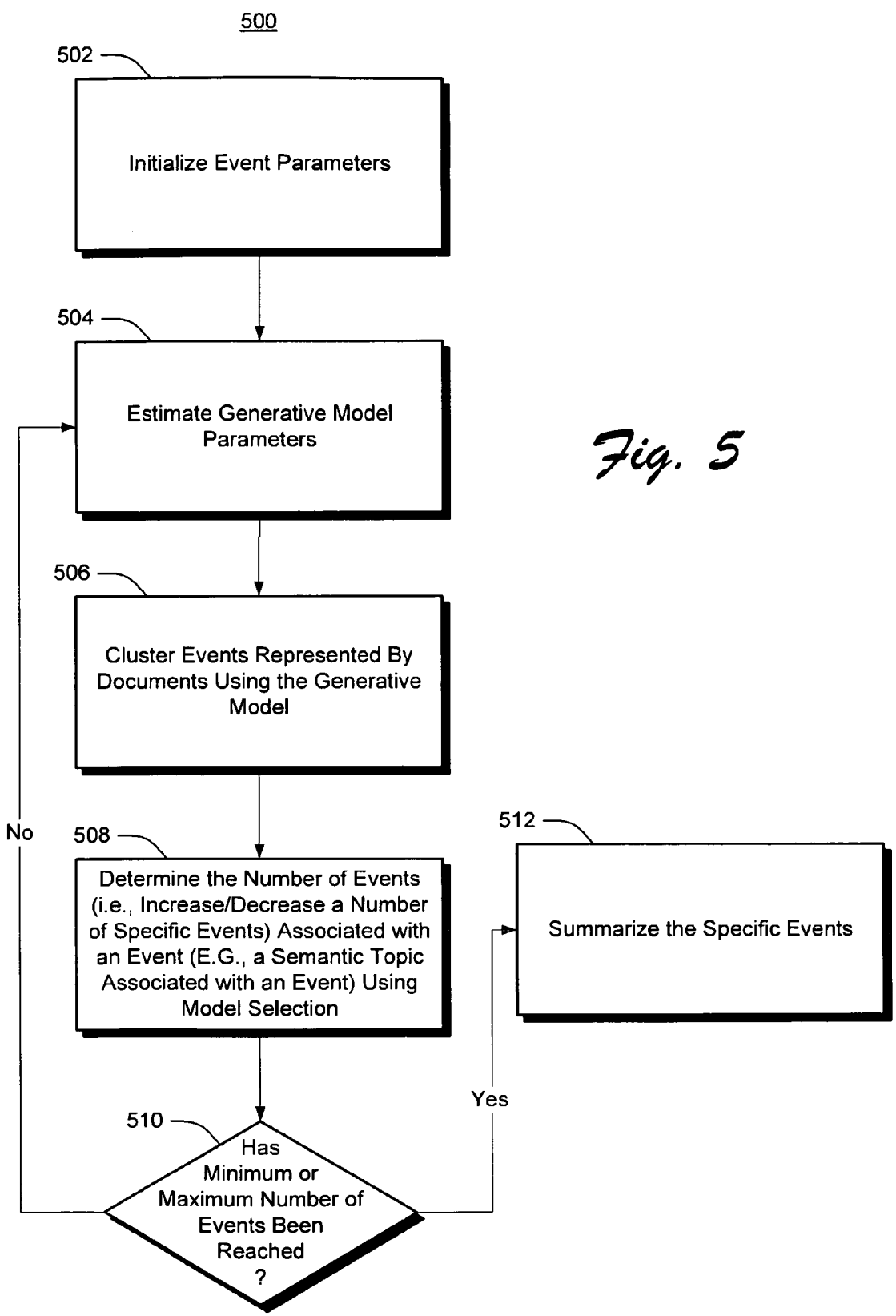
FIG. 5 illustrates a procedure for probabilistic retrospective event detection, according to one embodiment.

EXEMPLARY MULTI-MODAL RED OPERATIONS
Multi-modal RED Algorithm:

1. Initialize events parameters
   Using hill-climbing algorithm to find all peaks
   Using salient scores to determine the TOP 20% peaks, and initialize events correspondingly
2. Learn model parameters
   a. E-step: computing posteriors by (3)
   b. M-step: updating parameters by (4), (5) and (6)
3. Increase/decrease the initial number of events until the minimum/maximum events number is reached
   a. Splitting/merging current big/small peaks, and re-initialize events
      Goto step 2 -- until the maximum number of events have been reached.
4. Perform model selection by MDL according to Equation (8)
5. Summarize FIG. 5 illustrates a procedure 500 for probabilistic retrospective news event detection, according to one embodiment. For purposes of exemplary illustration, the operations of this procedure are described in reference to the components of system 200 of FIG. 2. At 502, event detection module 208 (FIG. 2) initializes event parameters. In one implementation, event detection module 208 performs these parameter initialization operations using a hill-climbing algorithm to find event peaks in a corpus 214 of documents. These parameter initialization operations include identifying an objectively representative set of peaks using salient scores. At 504, event detection module 208 estimates generative model 212 parameters. In one implementation, these model estimation operations include expectation maximization operations (please see Equations (3 through 6)). At 506, event detection module 208 clusters events (event clusters 218) represented by documents using the generative model 212. These event clusters provide probabilistic determinations of distributions of persons, locations, keywords, and time conditioned on events.

At 508, event detection module 208 determines the number of events for respective event clusters 218. These operations include increasing or decreasing a number of specific events using model selection operations. At 510, event detection module 208 determines whether a configurable minimum or maximum number of events in respective ones of event clusters 218 has been reached. If not, the operations of procedure 500 continue at 504, as described above, where in the event parameters determined by the previous operations 504 through 508 are utilized. Otherwise, at 512, event detection module 208 summarizes the specific events to assign one or more documents to respective events.

Exemplary Operating Environment

Figure 6:
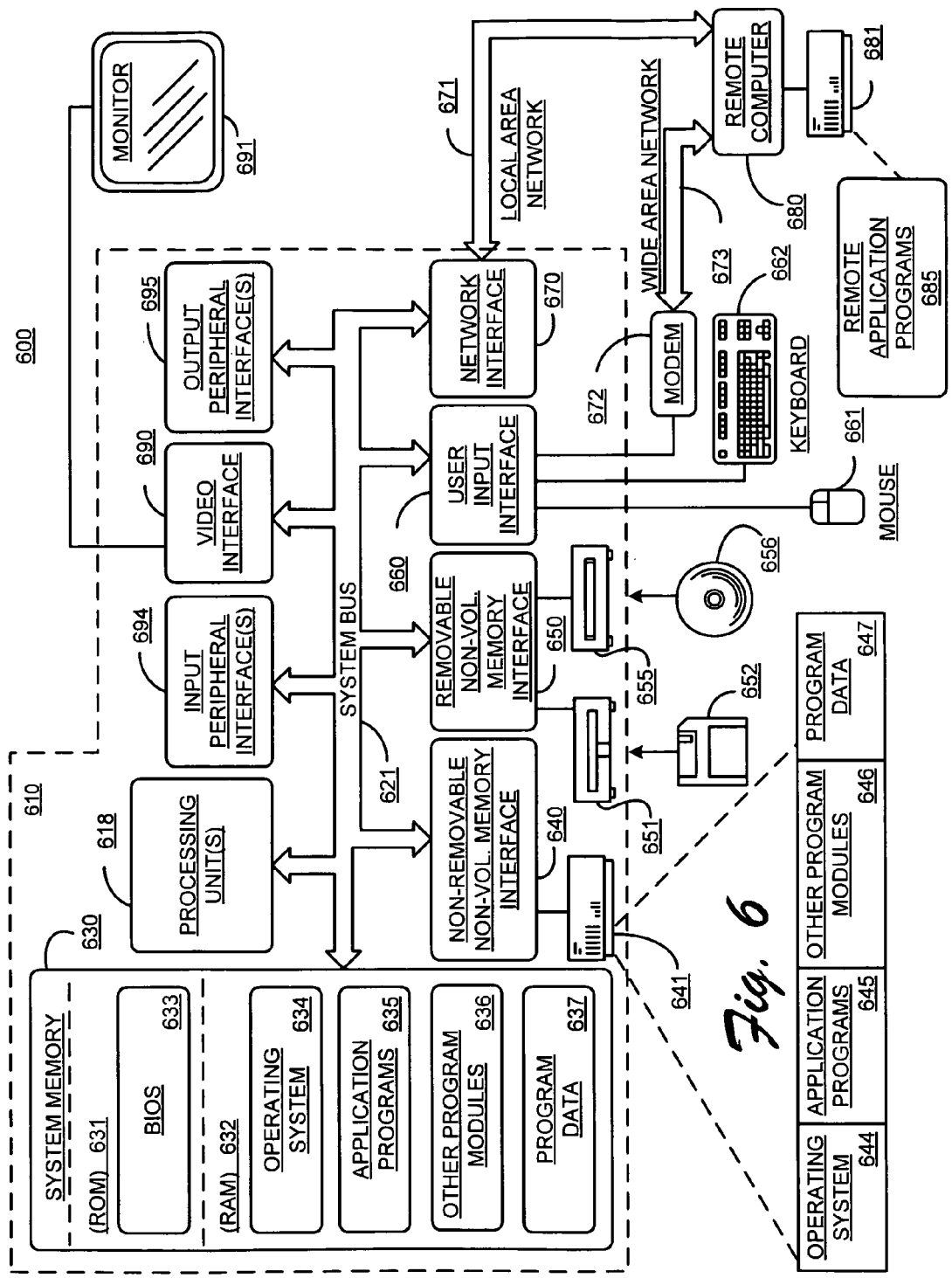
FIG. 6 shows an exemplary environment wherein probabilistic retrospective event detection can be partially or fully implemented, according to one embodiment.

FIG. 6 illustrates an example of a suitable computing environment in which probabilistic retrospective news event detection may be fully or partially implemented. Exemplary computing environment 600 is only one example of a suitable computing environment for the exemplary system 200 of FIG. 2, and is not intended to suggest any limitation as to the scope of use or functionality of systems and methods described herein. Neither should computing environment 600 be interpreted as having any dependency or requirement relating to any one or combination of components illustrated in computing environment 600.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 6, an exemplary system providing probabilistic retrospective news event detection architecture includes a general-purpose computing device in the form of a computer 610 implementing, for example, probabilistic retrospective event detection operations associated with computing device 202 of FIG. 2. Components of computer 610 may include, but are not limited to, processing unit(s) 618, a system memory 630, and a system bus 621 that couples various system components including the system memory 630 to the processing unit 618. The system bus 621 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 610 typically includes a variety of computer-readable media. Computer-readable media can be any available media that can be accessed by computer 610, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 618. By way of example and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that they are at least different copies.

A user may enter commands and information into the computer 610 through input devices such as a keyboard 662 and pointing device 661, commonly referred to as a mouse, trackball or touch pad. Other input devices (not shown) may include a microphone, joystick, graphics pen and pad, satellite dish, scanner, etc. These and other input devices are often connected to the processing unit 618 through a user input interface 660 that is coupled to the system bus 621, but may be connected by other interface and bus structures, such as a parallel port, game port or a universal serial bus (USB). In this implementation, a monitor 691 or other type of user interface device is also connected to the system bus 621 via an interface, for example, such as a video interface 690. Additionally, one or more input peripheral interface(s) 694 and one or more output peripheral interface(s) 695 may be provided to interface with input and output peripherals, respectively.

The computer 610 may operate in a networked environment using logical connections to one or more remote computers, such as a remote computer 680. The remote computer 680 may be a personal computer, a server, a router, a network PC, a peer device or other common network node, and as a function of its particular implementation, may include many or all of the elements described above relative to the computer 610, although only a memory device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface 670 or adapter. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example and not limitation, FIG. 6 illustrates remote application programs 685 as residing on memory device 681. The network connections shown are exemplary and other means of establishing a communications link between the computers may be used.

CONCLUSION

Although the above sections describe a probabilistic retrospective event detection architecture in language specific to structural features and/or methodological operations or actions, the implementations defined in the appended claims are not necessarily limited to the specific features or actions described. Rather, the specific features and operations for probabilistic retrospective event detection are disclosed as exemplary forms of implementing the claimed subject matter.

The invention claimed is:

1. A computer-implemented method implemented using instructions stored on a computer-readable medium and executable by a computing device, the method comprising:
    initializing event parameters to identify a number of salient events from a corpus of documents, wherein the events comprise occurrences that are described in the corpus of documents and are identified based on a salient score calculated from the distance between peaks on a graph, the peaks on the graph corresponding to each respective one of the events;
    probabilistically determining, using a generative model, whether documents are associated with a first event to detect representative events of the number of salient events, wherein probabilistically determining comprises:
        estimating parameters for the generative model using the event parameters;
        generating event clusters to cluster events reported by the documents using estimated generative model parameters;
        for each event cluster:
            increasing or decreasing a number of events to represent a corresponding event;
            if the number of events is not a minimum or a maximum number of events: (a) again performing operations associated with initializing the event parameters to generate re-initialized event parameters; and (b) using the generative model to probabilistically detect events from salient ones of the documents using the re-initialized event parameters; and
            if the number of events is a minimum or a maximum number of events, summarizing event(s) associated with the event cluster to assign content of one or more documents to respective events;
    selecting the first event reported by one or more of the documents; and
    for each entity associated with the first event:
        generating a respective news article for the first event; and
        determining a time for the respective news article.

2. The method of claim 1, wherein the generative model determines probabilistic distributions of persons, locations, keywords, and time conditioned on events to cluster document(s) to events.

3. The method of claim 1, wherein the generative model models document content and timestamps associated with events with different Bayesian mixture models.

4. The method of claim 1, wherein operations associated with the selecting, generating, and determining use one or more of mixing proportions of events, priors of events, conditional multinomial distributions given the event, and parameters of a conditional Gaussian distribution given the event.

5. The method of claim 1, wherein document content associated with an event of the respective events comprises one or more of information associated with persons, locations, and keywords and wherein probabilistically determining further comprises:
    modeling the document content with mixtures of different respective unigram models; and
    modeling the timestamps with a mixture model that is not one of the different respective unigram models.

6. The method of claim 1, wherein estimating the parameters further comprises estimating model parameters using expectation maximization to iteratively maximize log-likelihood.

7. The method of claim 1, wherein generating the event clusters further comprises:
    representing probability associated with time as a function of whether a date of the document is associated with a beginning stage of the event or associated with an end stage of the event; and
    wherein the beginning stage and the end stage represent a continuous duration of the event.

8. The method of claim 1, wherein generating the event clusters further comprises:
    independently estimating, for respective person, location, and keyword models, model parameters by iteratively determining expectation and maximization probabilities, the model parameters being a number of documents and a number of events; and
    calculating the probability using the models in view of temporal continuity of the event and any overlap of two or more of the events.

9. A computer-implemented method implemented using instructions stored on a computer-readable medium and executable by a computing device, the method comprising:
    initializing event parameters to identify a salient number of events from a corpus of documents, wherein the events comprise occurrences that are described in the corpus of documents, each event having an immediately preceding event in time and an immediately succeeding event in time, wherein the salient events are identified based on a salient score calculated by the amount of time between the immediately preceding event and the immediately succeeding event for each respective event;

estimating parameters for a generative model for probabilistic retrospective detection of the events from the salient number of events, the generative model comprising respective models for person(s), time(s), location(s), and keyword(s);

clustering events represented by documents using the parameters for the generative model;

increasing or decreasing a number of events associated with respective ones of clustered events to re-initialize events;

for respective event clusters, if a minimum or maximum number of events has not been reached, again performing operations of the estimating, clustering, and increasing or decreasing; and for respective event clusters, if a minimum or maximum number of events has been reached, summarizing events in resulting event clusters.

10. The method of claim 9, wherein initializing the event parameters further comprises:

selecting an event reported by one or more documents; and for each entity associated with the event:

generating a respective news article for the event; and determining a time for the respective news article.

11. The method of claim 10, wherein operations associated with the selecting, generating, and determining use one or more of mixing proportions of events, priors of events, conditional multinomial distributions given the event, and parameters of a conditional Gaussian distribution given the event.

12. The method of claim 9, wherein the generative model models document content and timestamps associated with events with different Bayesian models.

13. The method of claim 9, wherein the generative model models document content and timestamps associated with events with different Bayesian models, and wherein the document content comprises one or more of information associated with persons, locations, and keywords and wherein estimating the parameters further comprises:

modeling the persons, locations, and keywords with mixtures of different respective unigram models.

14. The method of claim 9, wherein estimating the parameters further comprises modeling time with a mixture model that is different than respective mixture models used to model document content associated with an event.

15. The method of claim 9, wherein estimating the parameters further comprises estimating model parameters using expectation maximization to iteratively maximize log-likelihood.

16. The method of claim 9, wherein generating the event clusters further comprises:

independently estimating, for respective person, location, and keyword models, model parameters by iteratively determining expectation and maximization probabilities, the model parameters being a number of documents and a number of events; and calculating the probability using the models in view of temporal continuity of the event and any overlap of two or more of the events.

17. A system comprising:

a processor;

memory; and a retrospective event detection module stored in the memory and executable on the processor, wherein when the retrospective event detection module is executed the processor is configured to perform acts comprising:

setting event parameters to identify documents comprising respective events;

probabilistically detecting events from documents using a multi-modal generative model, the generative model comprising independent mixture models to model document content associated with an event and time associated with the event, the document content comprising information corresponding to one or more of persons, locations, and keywords; and selecting the event reported by one or more of the documents; and for each entity associated with the event:

generating a respective news article for the event; and determining a time for the respective news article;

wherein the processor iteratively implements operations for setting the event parameters and probabilistically detecting the events until a configurable minimum or maximum number of events associated with respective ones of one or more salient events has been detected, each event having an immediately preceding event in time and an immediately succeeding event in time, wherein the salient events are identified based on a salient score calculated by the amount of time between the immediately preceding event and the immediately succeeding event for each respective event.

* * * * *